United States Patent
Hara et al.

(10) Patent No.: US 6,343,591 B1
(45) Date of Patent: Feb. 5, 2002

(54) FUEL VAPOR PROCESSING APPARATUS

(75) Inventors: Takeshi Hara; Hiroaki Mihara, both of Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/660,505

(22) Filed: Sep. 12, 2000

(30) Foreign Application Priority Data

Oct. 28, 1999 (JP) .......................................... 11-307829

(51) Int. Cl.⁷ ........................ F02M 37/04; B01D 35/147
(52) U.S. Cl. ......................................... 123/519; 55/313
(58) Field of Search ................................. 123/516, 518, 123/519, 520; 55/313, 417, 420

(56) References Cited

U.S. PATENT DOCUMENTS

| | | | |
|---|---|---|---|
| 5,450,833 A | * 9/1995 | Denz et al. ................. | 123/520 |
| 5,501,198 A | * 3/1996 | Koyama ..................... | 123/520 |
| 5,613,477 A | * 3/1997 | Maeda ........................ | 123/519 |
| 5,858,034 A | * 1/1999 | Shida et al. ................ | 123/519 |

* cited by examiner

*Primary Examiner*—Thomas N. Moulis
(74) *Attorney, Agent, or Firm*—Arent Fox Kintner Plotkin & Kahn, PLLC

(57) ABSTRACT

A fuel vapor processing apparatus is provided for realizing a high desorption performance and a high flexibility in layout resulting from a compact structure including a filter. The processing apparatus comprises a casing formed with a fuel vapor introducing port communicating with the fuel tank, and a fuel vapor discharge port communicating with the intake pipe. A partition is arranged in the casing for defining inside thereof a filter chamber which communicates with an air introducing port for introducing desorbing air from the atmosphere. The partition partitions the casing into a first chamber and a second chamber with a spacing interposed therebetween. The first and second chambers communicate with each other, and also communicate with the filter chamber, the fuel vapor introducing port, and the fuel vapor discharge port. The processing apparatus also comprises a filter contained in the filter chamber for filtering the desorbing air introduced from the air introducing port, and an adsorbent material filled in the first and second chambers for adsorbing the fuel vapor introduced from the fuel vapor introducing port.

2 Claims, 4 Drawing Sheets

FUEL VAPOR PROCESSING APPARATUS

BACKGROUND OF THE INVENTION

1. Field of the Invention

The present invention relates to a fuel vapor processing apparatus for temporarily storing a fuel vapor evaporated from a fuel tank of an internal combustion engine to discharge the stored fuel vapor to an intake pipe as appropriate in order to prevent the fuel vapor from being emitted to the atmosphere.

2. Description of the Related Art

The processing apparatus of the type mentioned above is generally referred to as a "canister". FIG. 1 illustrates an example of a conventional canister. The illustrated canister 51 comprises a box-shaped casing 52 which is partitioned into a main chamber 54 and a sub-chamber 55 by a partition wall 53. The main chamber 54 and the sub-chamber 55 communicate with each other at their adjacent ends to form a generally U-shaped flow passage. In addition, the main chamber 54 and the sub-chamber 55 are filled with adsorbent material 56 made of activated charcoal or the like. A blocking valve 58 is attached to an air introducing port 57 formed on the other end side of the sub-chamber 55. The blocking valve 58 is open to the atmosphere through a filter 59. The blocking valve 58 is closed when the canister 51 is checked for a fuel vapor leaking therefrom. On the other hand, a fuel vapor introducing port 60 and a fuel vapor discharge port 61 are arranged in parallel on the other end side of the main chamber 54. The fuel vapor introducing port 60 communicates with a fuel tank (not shown), while the fuel vapor discharge port 61 is connected to an intake pipe, not shown, through a discharge pipe provided with a purge control valve in the middle (both of which are not shown).

In the canister 51 constructed as described above, a fuel vapor evaporated from the fuel tank is introduced into the casing 52 through the fuel vapor introducing port 60, and is adsorbed and held by the adsorbent material 56 as it flows from the main chamber 54 to the sub-chamber 55. In this way, the fuel vapor passes along the U-shaped flow passage comprised of the sub-chamber 54 and the main chamber 55 to ensure a large length of flow path, as compared with the cross-sectional area of the casing 52, so that the desorption performance (the ability of adsorbing and desorbing the fuel vapor) is efficiently provided. The fuel vapor adsorbed on the adsorbent material 56 is desorbed from the adsorbent material 56 and emitted to an intake pipe through the fuel vapor discharge port 61 and the discharge pipe by desorbing air introduced from the air introducing port 57 to the accompaniment of a negative pressure in the intake pipe introduced into the casing 52 through the fuel vapor discharge port 61, as the purge control valve is opened during a predetermined operating condition of the internal combustion engine. Also, when the desorbing air flows into the casing 52, dust included therein is captured by the filter 59 to prevent a failure of the blocking valve 58 and an increase in air flow resistance within the casing 52 due to the intrusion of the dust.

However, since the conventional canister 51 described above has the filter 59 for filtering the desorbing air, which is provided separate from and external to the canister 51, the canister 51 requires a larger space for the entire size which is increased by the separate filter 59. In addition, the conventional canister 51 has difficulties in the layout of the filter 59 since the canister 51 and the filter 59 must be laid out separately. While a canister integrated with a filter is also known, the filter is attached to the top or a side surface of a casing of the canister, thereby resulting likewise in an increased size of the canister.

OBJECT AND SUMMARY OF THE INVENTION

The present invention has been made to solve the problem as mentioned above, and its object is to provide a fuel vapor processing apparatus which presents a high desorption performance and can be constructed in compact, including a filter, to improve the flexibility in layout.

To achieve the above object, the present invention provides a fuel vapor processing apparatus which is arranged between a fuel tank and an intake pipe of an internal combustion engine for temporarily storing a fuel vapor evaporated from the fuel tank to discharge to the intake pipe as required. The fuel vapor processing apparatus includes a casing formed with a fuel vapor introducing port communicating with the fuel tank, and a fuel vapor discharge port communicating with the intake pipe; a partition arranged in the casing for defining a filter chamber inside thereof which communicates with an air introducing port for introducing desorbing air from the atmosphere, wherein the partition partitions the casing into a first chamber (main chamber) and a second chamber (sub-chamber) with a spacing interposed therebetween, and the first and second chambers communicate with each other, and also communicate with the filter chamber, the fuel vapor introducing port, and the fuel vapor discharge port; a filter contained in the filter chamber for filtering the desorbing air introduced from the air introducing port; and an adsorbent material filled in the first and second chambers for adsorbing the fuel vapor introduced from the fuel vapor introducing port.

In this fuel vapor processing apparatus, a fuel vapor evaporated from the fuel tank flows into, for example, the first chamber through the fuel vapor introducing port formed through the casing. The inflow fuel vapor is adsorbed and held by the adsorbent material as it is flowing from the first chamber to the second chamber. The adsorbed fuel vapor is desorbed from the adsorbent material and emitted to the intake pipe through the fuel vapor discharge port by the desorbing air introduced through the air introducing port to the accompaniment with a negative pressure in the intake pipe which is introduced into the first chamber through the fuel vapor discharge port during a predetermined operating condition of the engine. Also, the filtering action of the filter on the desorbing air prevents an increase in air flow resistance in the first and second chambers due to intrusion of dust.

As described above, in the processing apparatus of the present invention, the interior space in the casing is partitioned by the partition into the main chamber and the sub-chamber which are filled with the adsorbent material, and communicate with each other. The main chamber is separated from the sub-chamber by a spacing corresponding to the width of the partition. Thus, the surface area surrounding the main chamber and the sub-chamber is increased to facilitate heating of the adsorbent material such as activated charcoal, which is cooled during desorption, with external heat, resulting in the advantage of providing a better desorption performance and accordingly a higher desorption performance. Also, since the internal space of the partition for partitioning the main chamber and the sub-chamber is utilized as the filter chamber for containing the filter, the processing apparatus can be constructed in compact to improve the flexibility in layout.

Preferably, in this case, the fuel vapor processing apparatus further comprises a blocking valve contained in the filter chamber downstream of the filter, wherein the blocking valve is closed when the casing is checked for a fuel vapor leaking therefrom.

According to this structure, the filtering action of the filter prevents a failure of the blocking valve due to intrusion of dust. Also, since the blocking valve as well as the filter are contained in the filter chamber, the processing apparatus can be constructed further in compact to further improve the flexibility in layout.

DESCRIPTION OF THE PREFERRED EMBODIMENTS

The present invention will hereinafter be described in connection with several preferred embodiments thereof with reference to the accompanying drawings.

Figure 1:
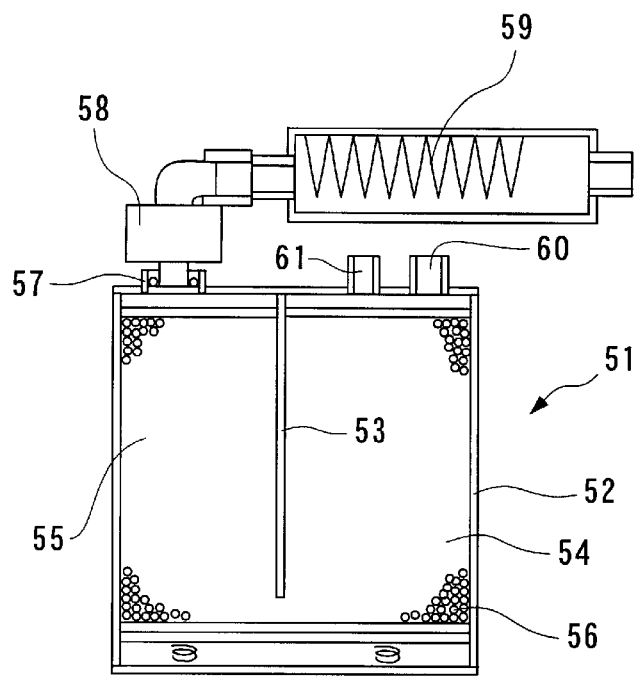
FIG. 1 is a cross-sectional view illustrating a conventional canister.
Figure 2:
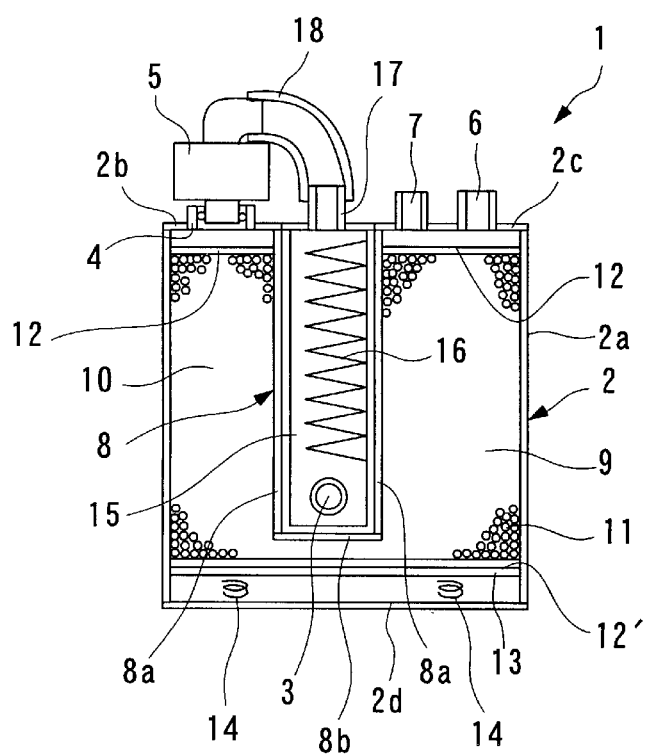
FIG. 2 is a cross-sectional view illustrating a canister according to a first embodiment of the present invention.

FIG. 2 illustrates a canister (processing apparatus) according to a first embodiment of the present invention. As illustrated in FIG. 2, the canister 1 comprises a box-shaped casing 2. The casing 2 is comprised of a casing body 2a which is open on both upper and lower ends; and left and right upper cover plates 2b, 2c and a bottom cover plate 2d for covering the top and bottom of the casing body 2a, respectively.

The casing body 2a is formed in a lower portion thereof with an air introducing port 3 which is open to the atmosphere. The upper left cover plate 2b is formed with a mounting port 4 to which a blocking valve 5 is mounted. The blocking valve 5 is closed when the canister 1 is checked for a fuel vapor leaking therefrom, and may comprise, for example, a solenoid valve. Also, the upper right cover plate 2c is formed with a fuel vapor introducing port 6 and a fuel vapor discharge port 7 arranged in parallel with each other. The fuel vapor introducing port 6 communicates with a fuel tank (not shown), while the fuel vapor discharge port 7 is connected to an intake pipe, not shown, through a discharge pipe provided with a purge control valve (both of which are not shown) in the middle.

The casing 2 is provided with a partition 8 in a central portion thereof. The partition 8 is comprised of two side walls 8a extending vertically with a predetermined spacing defined therebetween, and a bottom wall 8b which closes the space between the lower ends thereof. The casing 2 is partitioned by the partition 8 into a main chamber 9 (first chamber) on the right side, and a sub-chamber 10 (second chamber) on the left side. In addition, the partition 8 has a length slightly shorter than the height of the casing body 2a and extends from the top end of the casing body 2a, so that the main chamber 9 and the sub-chamber 10 communicate with each other through their lower end portion to form a generally U-shaped flow passage. The sub-chamber 10 and the main chamber 9 are covered with the aforementioned left and right upper cover plates 2b, 2c, respectively.

The main chamber 9 and the sub-chamber 10, including the communication path therebetween, are filled with an adsorbent material 11 made of activated charcoal. Above the adsorbent material 11, left and right filters 12 are arranged corresponding to the sub-chamber 10 and the main chamber 9, respectively, while below the adsorbent material 11, a pressing plate 13 and an overlying filter 12' are arranged with springs 14 interposed between the pressing plate 13 and the lower cover plate 2d. With this structure, the adsorbent material 11 is filled in the main chamber 9 and the sub-chamber 10 as it is pressed by the pressing plate 12 with spring forces of the springs 14.

A space defined by the two side walls 8a and the bottom wall 8b of the partition 8 serves as a filter chamber 15. The air introducing port 3 is open to the filter chamber 15, and a filter 16 is contained above the air introducing port 3. The filter 16, which is made, for example, of paper in the shape of bellows, captures and filters out dust and so on included in desorbing air introduced from the air introducing port 3. The filter chamber 15 communicates with the blocking valve 5 through a tube 18 made of rubber connected between an outlet 17 formed through the upper end of the filter chamber 15 and the blocking valve 5.

According to the canister 1 constructed as described above, a fuel vapor introduced from the fuel vapor introducing port 6 is adsorbed and held by the adsorbent material 11, as it flows from the main chamber 9 to the sub-chamber 10. The fuel vapor adsorbed by the adsorbent material 11 is desorbed from the adsorbent material 11 and emitted to an intake pipe through the fuel vapor discharge port 7 by the desorbing air introduced through the air introducing port 3 to the accompaniment with a negative pressure in the intake pipe introduced into the main chamber 9 through the fuel vapor discharge port 7 as the purge control valve is opened during a predetermined operating condition of the engine. The desorbing air is filtered by the filter 16 contained in the filter chamber 15, and flows into the sub-chamber 10 through the open blocking valve 5. This filtering action of the filter 16 prevents a significant increase in air flow resistance within the main chamber 9 and the sub-chamber 10 and a failure of the blocking valve 5, possibly resulting from intrusion of dust into the chambers 9, 10.

As described above, according to the canister 1 of the first embodiment, the space inside the casing 2 is partitioned by the partition 8 into the main chamber 9 and the sub-chamber 10 which are filled with the adsorbent material 11 and communicate with each other, and the main chamber 9 is spaced from the sub-chamber 10 by the spacing corresponding to the width of the partition 8. Thus, the surface area surrounding the main chamber 9 and the sub-chamber 10 is increased to facilitate heating of the adsorbent material such as activated charcoal, which is cooled during desorption, with external heat, resulting in the advantage of providing a better desorption performance and accordingly a higher desorption performance. Also, since the internal space of the partition 8 for partitioning the main chamber 9 and the sub-chamber 10 is utilized as the filter chamber 15 for containing the filter 16, the canister 1 can be constructed in compact to improve the flexibility in layout. In this case, since the interior of the filter chamber 15 is fully empty except for the bellows type thin filter 16, the filter 16 contained in the filter chamber 15 will not substantially affect the desorption performance of the canister 1.

Figure 3:
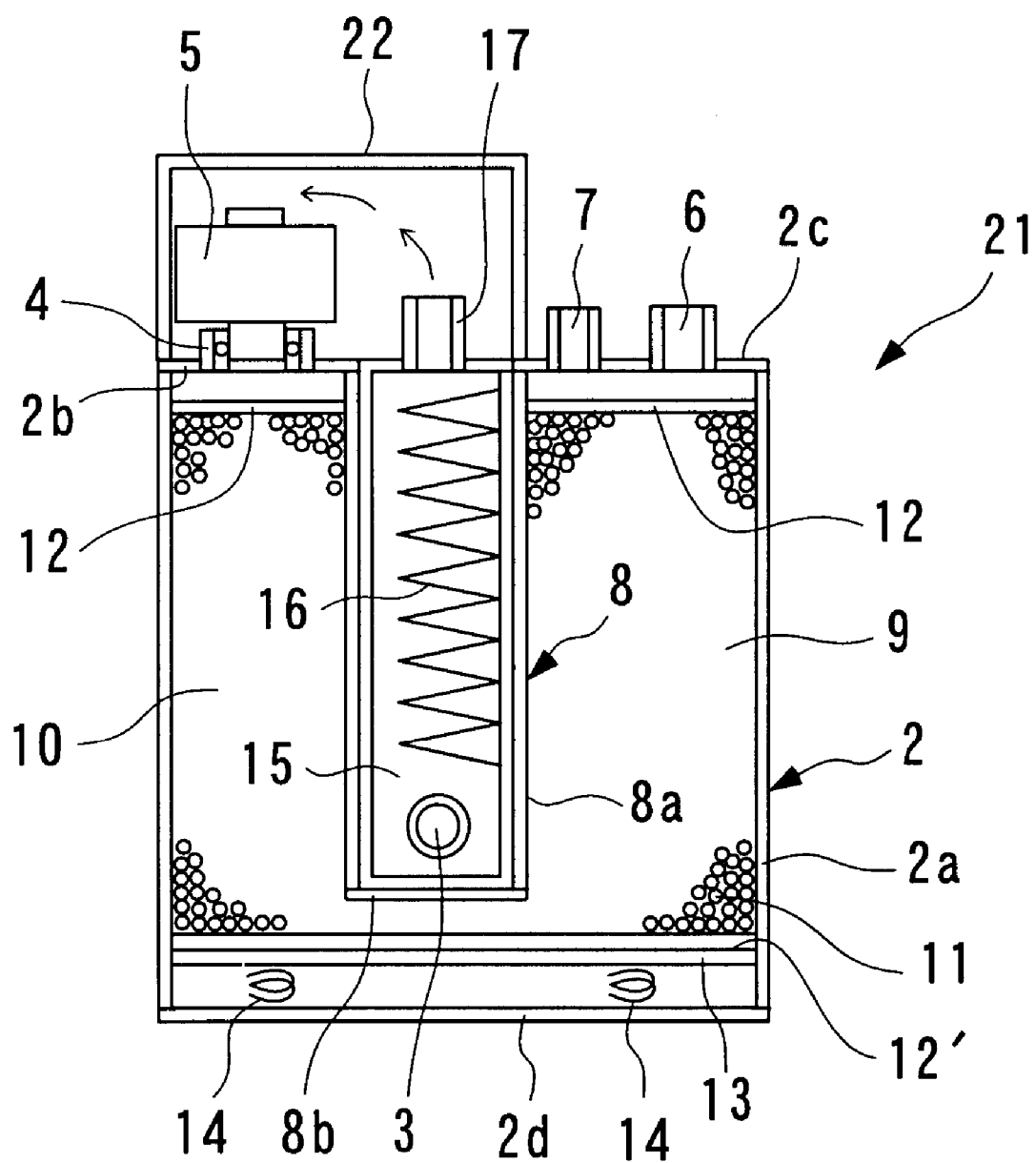
FIG. 3 is a cross-sectional view illustrating a canister according to a second embodiment of the present invention.

FIG. 3 illustrates a canister according to a second embodiment of the present invention. In the following description, the components identical to those in the foregoing first embodiment are designated the same reference numerals, and description thereon will be omitted if possible. The illustrated canister 21 removes the tube 18 connecting the outlet 17 of the filter chamber 15 to the blocking valve 5 in the canister 1 of the first embodiment, and instead covers the outlet 17 and the blocking valve 5 with a cover 22 in a sealing structure to communicate the filter chamber 15 with the blocking valve 5. The rest of the structure is similar to that of the first embodiment. In the second embodiment, therefore, it is also possible to produce completely similar effects to those of the first embodiment.

Figure 4:
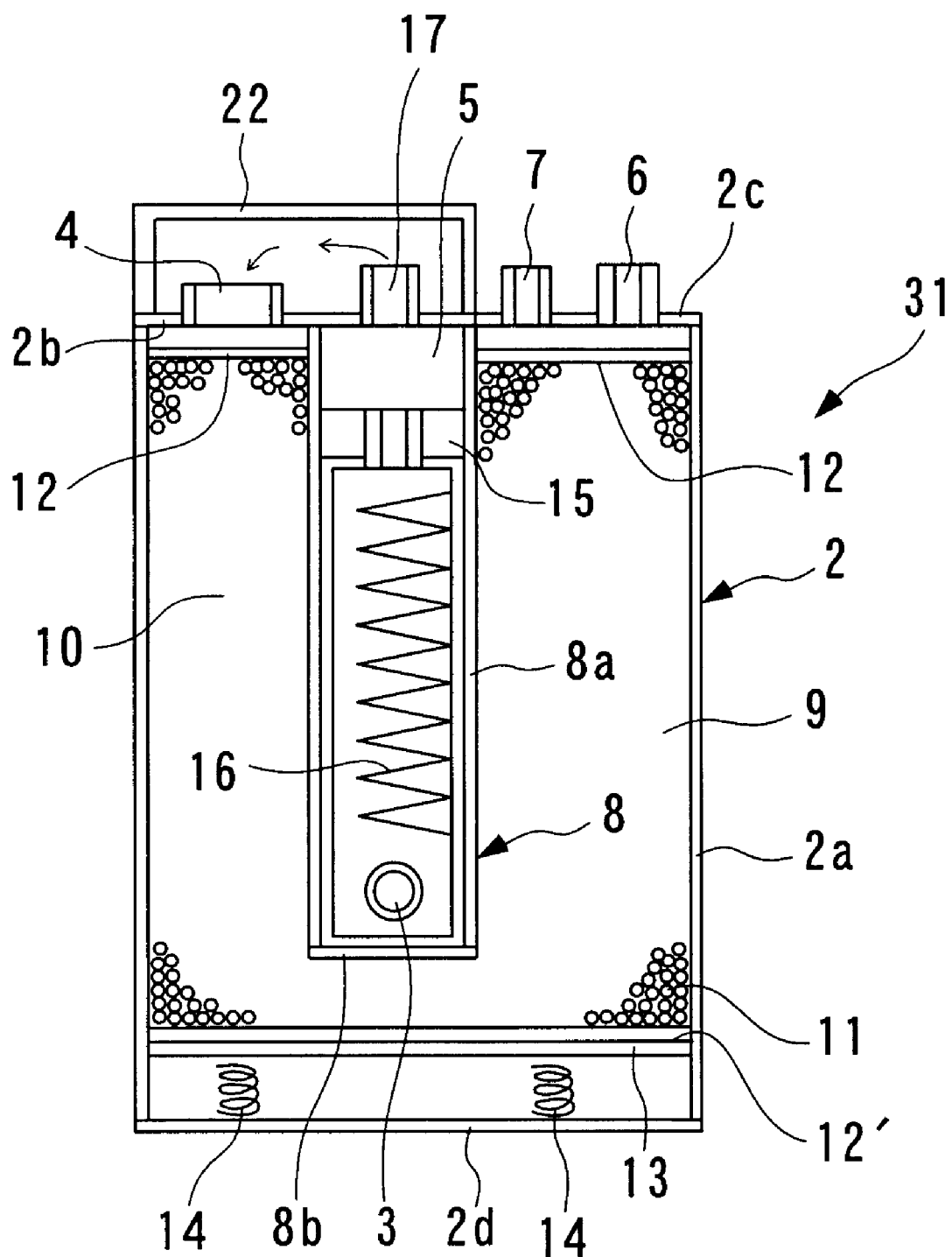
FIG. 4 is a cross-sectional view illustrating a canister according to a third embodiment of the present invention.

FIG. 4 illustrates a canister according to a third embodiment of the present invention. The illustrated canister 31 contains the blocking valve 5 in the filter chamber 15 together with the filter 16 on the upper side, i.e., upstream of the filter 16. This structure is particularly suitable when the space for the filter chamber 15 is relatively wide. Similar to the second embodiment, the blocking valve 5 and the sub-chamber 10 are communicated through the cover 22. The rest of the structure is similar to that of the second embodiment. In the third embodiment, therefore, it also is possible to produce completely similar effects to those of the two previous embodiments. In addition, since the blocking valve 5 as well as the filter 16 are contained in the filter chamber 15, the canister 31 can be constructed further in compact to further improve the flexibility in layout. In the alternative, the cover 22 may be replaced with a tube for communicating the blocking valve 5 with the sub-chamber 10.

Figure 5:
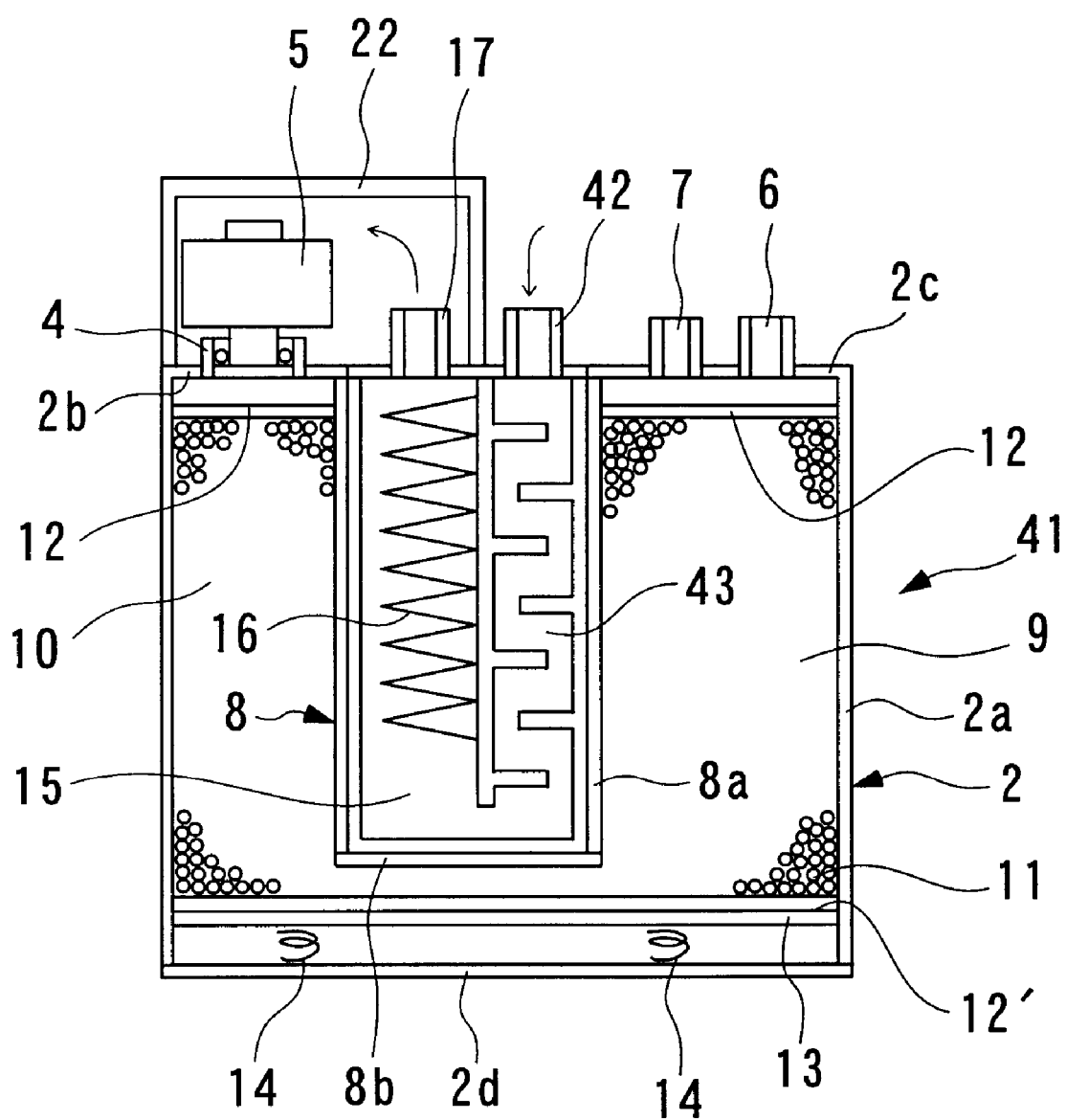
FIG. 5 is a cross-sectional view illustrating a canister according to a fourth embodiment of the present invention.

FIG. 5 illustrates a canister according to a fourth embodiment of the present invention. The illustrated canister 41 arranges an air introducing port 42 on the top of the casing 2 and an additional flow passage 43 extending from the air introducing port 42 in the shape of crank along the filter chamber 15, with a lower end of the flow passage 43 communicated with the filter chamber 15. The rest of the structure is similar to that of the second embodiment. In the fourth embodiment, therefore, it is also possible to produce completely similar effects to those of the previously described embodiments. In addition, since desorbing air passes through the crank-shaped flow passage 43 before reaching the filter chamber 15, the proportion of dust intruding into the filter 16 can be reduced to alleviate the load on the filter 16.

It should be understood that the present invention can be practiced in a variety of implementations without limited to the foregoing embodiments. For example, the positioning of the air introducing port 3, fuel vapor introducing port 6, fuel vapor discharge port 7 and so on shown in the foregoing embodiments is merely illustrative, and may be changed as appropriate without departing from the spirit and scope of the present invention defined by the accompanying claims.

As will be appreciated from the foregoing description, the fuel vapor processing apparatus according to the present invention is advantageous in a high desorption performance, a compact structure including the filter, and a high flexibility in layout, and so on.

What is claimed is:

1. A fuel vapor processing apparatus arranged between a fuel tank and an intake pipe of an internal combustion engine for temporarily storing a fuel vapor evaporated from said fuel tank to discharge to the intake pipe as required, comprising:

a casing formed with a fuel vapor introducing port communicating with said fuel tank, and a fuel vapor discharge port communicating with said intake pipe;

a partition arranged in said casing for defining a filter chamber inside thereof, said filter chamber communicating with an air introducing port for introducing desorbing air from the atmosphere, said partition partitioning said casing into a first chamber and a second chamber with a spacing interposed therebetween, said first and second chambers communicating with each other, said first and second chambers also communicating with said filter chamber, said fuel vapor introducing port, and said fuel vapor discharge port;

a filter contained in said filter chamber for filtering the desorbing air introduced from said air introducing port; and an adsorbent material filled in said first and second chambers for adsorbing the fuel vapor introduced from said fuel vapor introducing port.

2. A fuel vapor processing apparatus according to claim 1, further comprising a blocking valve contained in said filter chamber downstream of said filter, said blocking valve being closed when checking for a fuel vapor leaking from said casing.

* * * * *